United States Patent [19]
Virey

[11] Patent Number: 5,755,380
[45] Date of Patent: May 26, 1998

[54] HEATING, VENTILATING AND/OR AIR CONDITIONING INSTALLATION WITH POWER CONTROL, ESPECIALLY FOR A MOTOR VEHICLE

[75] Inventor: Daniel Virey, Les Essarts le Roi, France

[73] Assignee: Valeo Climatisation, La Verriere, France

[21] Appl. No.: 826,468

[22] Filed: Mar. 27, 1997

[30] Foreign Application Priority Data

Mar. 28, 1996 [FR] France .................... 96 03896

[51] Int. Cl.[6] .................................. B60H 1/02
[52] U.S. Cl. ............................ 237/12.3 R; 237/2
[58] Field of Search ............... 237/12.3 R, 12.3 B, 237/2, 33

[56] References Cited

U.S. PATENT DOCUMENTS 5,279,459  1/1994  Single, II .
5,478,274  12/1995  Danieau .

FOREIGN PATENT DOCUMENTS 1305867  8/1962  France .
2706816  12/1994  France .
43 30 878  6/1995  Germany .

OTHER PUBLICATIONS

French Search Report dated 24 Jan. 1997.

Automotive Engineering, vol. 98, No. 3, 1 Mar. 1990, pp. 55–59.

Primary Examiner—Henry A. Bennett
Assistant Examiner—Derek S. Boles
Attorney, Agent, or Firm—Morgan & Finnegan, L.L.P.

[57] ABSTRACT

A heating, ventilating and/or air conditioning apparatus includes an air heating duct containing a primary radiator of the hot fluid flow type and an electric auxiliary radiator, a stream of air being passed through both radiators. It also includes a signal processing module for governing operation of the apparatus in accordance with atmospheric parameters set by a user, and a temperature sensor for measuring the temperature of the fluid flowing in the primary radiator. The signal processing means include a regulating module which is arranged to make a selective decision as whether to energise the auxiliary radiator, and if so, to what extent, in accordance with the parameters set by the user and at least the measured temperature of the fluid in the primary radiator.

16 Claims, 1 Drawing Sheet

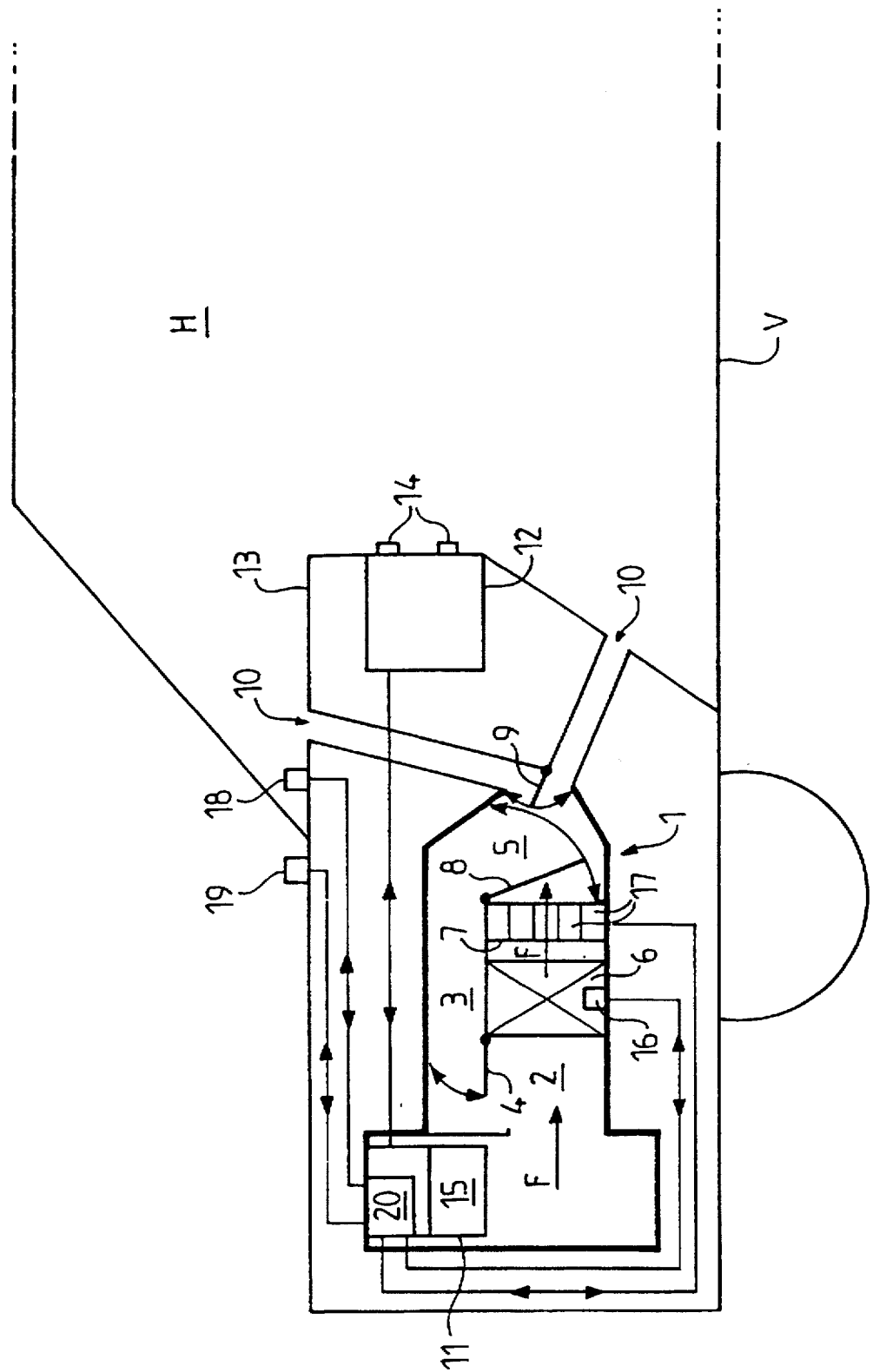
FIG. UNIQUE

HEATING, VENTILATING AND/OR AIR CONDITIONING INSTALLATION WITH POWER CONTROL, ESPECIALLY FOR A MOTOR VEHICLE

FIELD OF THE INVENTION

This invention relates to apparatus comprising heating, ventilating and/or air conditioning installations, especially for the cabin of a motor vehicle. More particularly, the invention concerns such an installation of the type comprising an air heating duct in which a primary radiator is mounted, the primary radiator being of the kind in which a hot fluid flows, with the air heating duct also including an electric auxiliary radiator, a stream of air being arranged to be passed through both radiators for delivery through air outlets into the cabin, with the installation also including signal processing means for governing the operation of the installation so as to satisfy cabin condition parameters set by a user of the vehicle.

BACKGROUND OF THE INVENTION

In this known type of apparatus, the electric auxiliary radiator, or air heater, can be brought into or out of use at will. It is supplied with electrical power by the signal processing means of the installation when the user, in the cabin of the vehicle, selects an operating mode in which the temperature in the cabin exceeds a predetermined threshold value. It is in fact the user who determines whether or not the auxiliary radiator will be operative or not. If the temperature initially selected by the user were substantially below the threshold value, and if the user later decided to select a new temperature well above the threshold value, then the heating power produced by the installation would vary very sharply, an effect which is highly uncomfortable for the occupants of the vehicle.

In addition, this increase in the heating power may, according to what climatic conditions are prevailing within the cabin and outside, not be sufficient to achieve the new required temperature. On the other hand, the increase in heating power may be too great.

DISCUSSION OF THE INVENTION

Accordingly, an object of the present invention is to overcome the drawbacks, such as those described above, in known types of installations for heating, ventilating and air conditioning.

According to the invention in a first aspect, an installation for heating, ventilating and/or air conditioning, especially for a motor vehicle, of the type comprising an air heating duct containing a primary radiator of the hot fluid flow type, together with an electric auxiliary radiator, the said radiators being adapted for a stream of air to pass through them, the air heating duct being in communication with air outlets exhausting into a cabin of the vehicle, the installation further including signal processing means adapted to govern operation of the installation as a function of cabin condition parameters set by a user, is characterised in that it further includes a temperature sensor for measuring the temperature of fluid flowing in the primary radiator, and in that the signal processing means include a regulating module adapted to make a selective decision as regards the electrical power supply to the auxiliary radiator, as a function of at least cabin condition parameters set by the user and the measured temperature of the said fluid.

With this arrangement it is possible to regulate the heating power delivered by the installation having regard, in particular, to the temperature of the fluid flowing in the primary radiator, which depends on the temperature of the stream of air passing through the primary radiator. This air is taken from outside the vehicle and/or from inside the vehicle, and is consequently dependent on atmospheric conditions which are prevailing in these various locations.

The regulating module is preferably arranged to carry out its selective decision as a function of a first calculation of: (a) the theoretical heating power necessary in order to satisfy at least the cabin condition parameters set by the user; and (b) a second calculation of the heating power available from the primary radiator, as a function of, firstly, the measured temperature in the said fluid, and secondly, a comparison between the theoretical heating power and the available is heating power.

The invention is also applicable to an installation which further includes means for transmitting, to the signal processing means, signals representing atmospheric parameters measured within and/or outside the cabin. In this case, and in accordance with a preferred feature of the invention, the regulating module is so arranged as to carry out its first calculation (relating to the theoretical heating power) as a function of not only the cabin condition parameters set by the user, but also the measured values of the atmospheric parameters. Thus, it is possible to carry out very fine adjustment of the heating power supplied by the installation, by taking into account not only the temperature of the fluid flowing in the primary radiator, but also the atmospheric conditions within the cabin and/or outside the cabin.

According to another preferred feature of the invention, the regulating module is so arranged as to decide on the electrical power supply to the auxiliary radiator when the available heating power (which it has previously calculated) is of a value lower than that of the theoretical heating power.

The electrical auxiliary radiator is preferably an electrical resistance radiator, the resistances, i.e. the resistive heating elements, of which are, again preferably, of the positive temperature coefficient (PTC) type.

PTC resistances have a value of impedance or resistance which varies very sharply with temperature, by contrast with conventional pure or passive resistances, the impedance of which is nearly constant regardless of temperature. The impedance value, or ohmic value, of a PTC resistance increases very rapidly when the working temperature exceeds a critical threshold value. Consequently, PTC resistances have the advantage of being automatically regulated in temperature, so that the heating power which they provide adjusts itself for a substantially constant working temperature and in an established operating mode. It is thus possible, using such resistances, to match in a very simple way the electrical power consumption with the required heating power.

In one particular embodiment of the invention, the electrical resistances of the auxiliary radiator are divided into independent groups, which are adapted to be supplied with electrical power separately from each other or in combination, as required. In that case, the regulating module is, in accordance with a preferred feature of the invention, so arranged as to determine the number of groups of resistances to be energised electrically, as a function of the difference between the theoretical heating power and the available heating power.

According to yet another preferred feature of the invention, the signal processing means are so arranged as to sample the or each measurement periodically, the regulating module being arranged to make its selective decision after each fresh sampling operation. The period between sampling operations can be made adjustable as required.

According to a still further preferred feature of the invention, the electrical auxiliary radiator is located downstream of the primary radiator (with reference to the direction of flow of the stream of air within the air heating duct).

According to the invention in a second aspect, a method of regulating an installation for heating, ventilating and/or air conditioning, especially in a motor vehicle, of the type comprising an air heating duct containing a primary radiator of the hot fluid flow type together with an electrical auxiliary radiator, the said radiators being adapted for a stream of air to be passed through them, with the said air heating duct communicating with air outlets exhausting into a cabin of the vehicle, the installation further including signal processing means for governing operation of the installation in accordance with atmospheric parameters set by a user of the vehicle, is characterised in that it includes the following phases:

(a) measuring the temperature of the fluid flowing in the primary radiator, and (b) making a selective decision relating to the electrical power supply to the auxiliary radiator, as a function at least of the atmospheric parameters set by the user and of the measured temperature of the said fluid.

Preferably, phase (b) comprises the following steps:

(b1) calculating a theoretical heating power as a function at least of the atmospheric parameters set by the user, (b2) calculating the heating power available from the primary radiator as a function of the measured temperature of the said fluid, and (b3) comparing the theoretical heating power calculated in step (b1) with the available heating power calculated in step (b2).

Preferably, the calculation carried out in step (b1) takes into account atmospheric parameters measured inside and/or outside the cabin with the aid of appropriate sensors.

According to a further feature of the invention, the decision regarding the electrical supply to the auxiliary radiator is taken when, in step (b3), the available heating power measured in step (b2) is less than the theoretical heating power measured in step (b1). Where this available heating power is less than the theoretical heating power, the method preferably includes a further step (b4), in which the heating power required from the auxiliary radiator is determined in order that the theoretical heating power shall be equal to the available heating power added to the heating power which it is necessary to provide in order to satisfy the required conditions.

According to yet another feature of the invention, phases (a) and (b) of the method are repeated periodically so long as the installation is in use by the user.

Further features and advantages of the invention will appear more clearly on a reading of the following detailed description of a preferred embodiment of the invention, which is given by way of non-limiting example only and with reference to the single Figure of the accompanying drawing.

BRIEF DESCRIPTION OF THE DRAWING

The drawing is a view in cross section along a longitudinal axis, showing the front end of a motor vehicle with a diagrammatic representation of an apparatus according to the invention.

DESCRIPTION OF A PREFERRED EMBODIMENT OF THE INVENTION

The drawing shows diagrammatically a motor vehicle V, with a front engine compartment, in which the apparatus according to the invention is installed. This apparatus consists of a heating and ventilating apparatus for the cabin H of the vehicle. The apparatus is indicated within thick lines at 1 in the drawing. It comprises, in particular, a motorised fan unit (not shown), a first, or air heating, duct 2, and a second or bypass duct 3, in parallel with each other.

An air distribution device 4, in this example in the form of a flap valve, is arranged at the upstream or inlet ends of the two ducts 2 and 3. The fan of the motorised fan unit is arranged to pass a stream of air, taken from the outside and/or from the cabin H, into the ducts 2 and 3, with the valve 4 controlling the distribution of the air into these ducts.

The air heating duct 2 exhausts at its downstream end into a mixing chamber 5. The heating duct 2 contains an air heater 6 in the form of a radiator in which a hot fluid flows. The heater 6 will be referred to as the primary radiator. The first duct 2 also contains an auxiliary radiator 7, downstream of the primary radiator 6. The radiator 7 is an electric air heater. The expressions "upstream" and "downstream" are to be understood to refer to the direction of flow of the air from the fan, which is indicated by the arrows F.

The second duct 3, or bypass duct, has two ends which are in communication with the corresponding ends of the air heating duct 2. The downstream end of the bypass duct 3 accordingly exhausts, like that of the air heating duct 2, into the mixing chamber 5. The downstream ends of the ducts 2 and 3 are associated with a second valve 8, typically of the same type as the first valve 4, which controls the mixture of hot air from the air heating duct 2 and cold air from the bypass duct 3. The mixing chamber 5 has an outlet end controlled by a third valve 9, which is typically of the same type as the valves 4 and 8, and which distributes the air from the mixing chamber 5 to passages which lead to air vents 10 exhausting into the cabin H.

Operation of the valves 4, 8 and 9, and of the primary radiator and auxiliary radiator 7, is controlled by a signal processing module 11. The module 11 is adapted to convert into a command signal, which is for example a signal for putting one or more of the valves into a required position, and/or for energising at least one of the radiators 6 and 7, orders addressed to the module 11 by a command module 12 mounted in the fascia 13 in the cabin H. An order addressed by the command module 12 is to be understood to mean any signal from the module 12 representing operating parameters set by a user in the cabin H, by means of buttons 14 which are provided for this purpose on the face of the command module 12.

The various parameters, values of which can be set on the module 12, relate to the atmospheric conditions within the cabin H. In particular, they may include the temperature in the cabin, the temperature in the particular zones into which processed air from the apparatus 1 is to be distributed, or the flow rate of this processed air.

Thus, once one or more parameters of cabin conditions are set by a user on the command module 12, the module 12 passes to the signal processing module 11 an order for the latter to carry out predetermined adjustments in the apparatus 1, as appropriate, these adjustments corresponding to the set values of the above mentioned parameters. The signal processing module 11 therefore includes a memory in which a correspondence table is stored. This correspondence table is a table of correspondence between cabin condition parameters and operating parameters appropriate to adjustments of the various components of the apparatus 1.

The signal processing module includes a regulating module 15 which governs the operation of the auxiliary radiator 7. The regulating module 15, together with the other modules 11 and 12, consist of ordinary commercially available electronic components. The module 15 is arranged to compute, given the cabin condition parameters set on the command module 12, the theoretical heating power which the apparatus must provide in order that all of the cabin condition parameters which have been set by the user can be satisfied.

In order to achieve this condition, the regulating module 15 carries out a second calculation so as to determine the heating power which is available from the primary radiator 6. This calculation of available heating power requires the temperature of the fluid flowing within the primary radiator 6 to be known. To this end, the primary radiator 6 includes a temperature sensor 16 which delivers a continuous signal, representing the instantaneous prevailing value of temperature of the fluid, to the signal processing module 11, which passes this to its regulating module 15. The latter is capable of associating a value of available heating power with the fluid temperature measured by the sensor 16.

Given that the available heating power is known, the regulating module 15 must then carry out a comparison between the theoretical heating power calculated as mentioned above, and the available heating power associated with the temperature measurement in the fluid in the primary radiator 6. The result of this comparison, which in practice consists of a subtraction between the calculated theoretical heating power and the available heating power, enables the regulating module 15 to make a decision relating to the supply of electrical power to the auxiliary radiator 7.

In this connection, if the heating power which is available from the primary radiator 6 is greater than the calculated theoretical heating power, it is then not necessary to activate the auxiliary radiator 7. By contrast, if the heating power available from the primary radiator 6 is less than the computed theoretical heating power, then the auxiliary radiator 7 must be energised.

The auxiliary radiator 7 is preferably a radiator the electrical resistive heating elements 17 of which, again more preferably, are of the positive temperature coefficient, or PTC, type discussed above. In one particular embodiment, the electrical elements 17 of the radiator 7 are arranged in independent groups over the whole of the surface over which the stream of air F flows, with each of these groups having an electrical power supply which is independent of that of another group, so that these groups can be energised either separately or in combination.

Thus, when the regulating module 15 carries out the subtraction between calculated theoretical heating power and available heating power, the value of the resulting difference determines the group, or number of groups, of resistances 17 that are to be energised electrically. This determination must satisfy the criterion that the additional heating power to be supplied by the auxiliary radiator 7, in order to augment the heating power from the primary radiator 6, should be substantially equal to the calculated theoretical heating power, being that which is necessary to satisfy the cabin condition parameters set by the user.

This particular embodiment, by contrast with the arrangement described earlier herein which operated on an "all or nothing" basis, gives much finer control of the amount of heat distributed into the cabin H.

In order to improve still further the regulation of the heating power distributed into the cabin H, it is possible to take into account, in addition to the temperature of the fluid flowing in the primary radiator 6, atmospheric parameters relating to the interior of the cabin H and/or relating to the environment outside the cabin. To this end, a sensor 18 may for example be located in the cabin H. The sensor 18 can be arranged to monitor the degree of humidity and the temperature in the cabin. It may be supplemented by a further sensor or sensors, for instance a sensor 19 which is installed on an external surface of the vehicle for measuring, for example, the degree of humidity in the temperature outside the cabin H. These two sensors 18 and 19 deliver continuous signals, representing measurements of the parameters concerned, to the signal processing module 11.

When the heating installation is designed to provide air conditioning for the cabin of the vehicle, it does of course already include the various sensors 16, 18 and 19.

The values of the various atmospheric parameters measured by the sensors 18 and 19 are addressed to the regulating module 15, which then performs the calculation of theoretical heating power, in response, firstly to the atmospheric parameters set by the user on the command module 12, and secondly to the measured atmospheric parameters. This gives the regulation of the apparatus a greatly enhanced degree of fine control.

The signal processing module 11 preferably includes a timer 20, which enables it to address the values of the latest measurements performed by the various sensors 16, 18 and 19 to the regulating module at regular time intervals, so that the regulating module 15 can periodically perform its decision-making function as regards the power supply to the auxiliary radiator 7. This can, if desired, consist of partial or total supply of power. The frequency of this sampling of the various measured values by the signal processing module 11 depends on the duration of the timing cycle of the timer 20, which can be set or adjusted according to particular requirements.

In operation, once the user has set the required cabin condition parameters, the heating and ventilating installation operates in accordance with the procedure which will now be described.

In a first phase of this procedure, the temperature of the fluid flowing in the primary radiator 6 is measured. In a second phase, a decision is made relating to the supply of electrical power to the auxiliary radiator 7, as a function at least of the cabin condition parameters set by the user and the temperature of the fluid in the primary radiator 6, as measured by the sensor 16.

This second phase preferably comprises the following steps:

(1) a calculation of a theoretical heating power necessary for operation of the apparatus 1 in order that the required values of cabin condition parameters are satisfied, this calculation being carried out as a function at least of these required values;

(2) a calculation of heating power currently available from the primary radiator 6, as a function of the temperature of the fluid flowing in the primary radiator 16 as measured by the sensor 16; and (3) a comparison of the calculated theoretical heating power from step 1 with the available heating power calculated in step 2.

Where the installation also includes means for measuring the atmospheric parameters inside the cabin, outside the cabin, or both (such as the sensors 18 and 19), the calculation which is performed in step 1 takes into account not only the cabin condition parameters set by the user, but also the atmospheric parameters measured inside and/or outside the cabin.

In addition, in the second phase, the decision relating to the electrical power supply to the auxiliary radiator 7 is taken when the heating power available from the primary radiator 6 is less than the theoretical value of heating power that must be provided in order to satisfy the cabin condition parameters set by the user.

Similarly, where the auxiliary radiator 7 is subdivided as described above, so that different parts of this radiator can be energised independently of each other, a fourth step can be added to step 2. In this fourth step, using the difference between the available heating power and the theoretical heating power, the additional heating power which must be provided by the auxiliary radiator 7, in order that the calculated theoretical heating power shall be equal to the sum of the available heating power and the additional heating power, is determined.

Finally, it is preferable to carry out the two phases described above periodically while the installation is in use, that is to say so long as the user has not cancelled or altered the requirements by changing the settings made on the command module 12.

The invention is not limited to the embodiment described above and shown in the drawings, with or without the variations also described above by way of example, but extends also to other versions which may readily be developed by a person familiar with the art within the scope of the Claims that follow.

Thus for example, the number of cabin condition parameters which are measured may be as large as may be required, provided that these parameters have an influence on the heating power necessary for operation of the heating, ventilating and/or air conditioning system, in order to satisfy the criteria represented by the parameters set by the user on the command module.

In addition, although the auxiliary radiator described above is of the PTC type, other types of electrical auxiliary radiators may of course be used instead, such as for example those having pure resistances.

Finally, although in the installation described above the electrical auxiliary radiator 7 is located downstream of the fluid flow type radiator 6, it may instead be upstream of the latter.

What is claimed is:

1. Heating and ventilating apparatus for a motor vehicle having a cabin, comprising: an air heating duct; means for directing a stream of air through the air heating duct; a first radiator and a second radiator in the air heating duct, said radiators being adapted for the said stream of air to pass through them, the said first radiator including means for flow of a hot fluid through the first radiator whereby to yield heat to the said air, and the second radiator being an electrical auxiliary radiator; air outlet means exhausting into the cabin, the air heating duct having a downstream end connected to the said air outlet means; command means in the cabin adapted for a user of the vehicle to set required values of atmospheric parameters representing cabin conditions by means of the said command means; and signal processing means connected to the command means for receiving signals from the command means representing said required values, the signal processing means being connected to elements of the apparatus for controlling operation of the said elements according to the said required values of cabin condition parameters set by the user, wherein the apparatus further includes a temperature sensor associated with the first radiator for measuring the temperature of said fluid flowing in the first radiator, and the said signal processing means includes a regulating module connected to the second radiator for controlling the supply of electrical power to the second radiator, the said regulating module being adapted to make selective decisions as to the said power supply to the auxiliary radiator in accordance at least with the said required values of cabin condition parameters set by the user and the temperature measured by the said sensor.

2. Apparatus according to claim 1, wherein the regulating module is adapted to make its said decisions as a function of: a first calculation to determine a theoretical heating power necessary in order to achieve at least the required values of cabin condition parameters set by the user; a second calculation to determine the heating power available from the first radiator, in response to the measured temperature of the said fluid; and a comparison between the theoretical heating power and available heating power so determined.

3. Apparatus according to claim 2, further including sensor means in at least one location selected from inside and outside the cabin, said sensor means being connected to the said signal processing means for transmitting to the signal processing means signals representing atmospheric conditions measured by the said sensor means, wherein the regulating module is adapted to perform its said first calculation as a function of the said required values of parameters set by the user and the atmospheric conditions as measured by the said measuring means.

4. Apparatus according to claim 1, wherein the regulating module is adapted to make a decision to energise the auxiliary radiator when the available heating power is less than the theoretical heating power.

5. Apparatus according to claim 1, wherein the auxiliary radiator is an electrical resistance radiator.

6. Apparatus according to claim 5, wherein the auxiliary radiator includes a plurality of electrical resistances of the positive temperature coefficient type.

7. Apparatus according to claim 5, wherein the auxiliary radiator includes a plurality of electrical resistances divided into independent groups, with separate electrical power supply means for each said group, whereby the said groups can be energised separately or in combination.

8. Apparatus according to claim 7, wherein the regulating module is adapted to determine the number of said groups to be energised according to the difference between the theoretical heating power and the available heating power.

9. Apparatus according to claim 1 having at least one measuring means including said temperature sensor, the said at least one measuring means being adapted to transmit a continuous signal to the signal processing means, the signal processing means being adapted to sample the or each said signal periodically, with the regulating means being adapted to make a said decision each time such a periodic sampling is carried out, and in response to the result of that sampling.

10. Apparatus according to claim 1, wherein the auxiliary radiator is downstream of the first radiator.

11. A method of regulating a heating and ventilating apparatus for a motor vehicle, said apparatus comprising: an air heating duct; means for directing a stream of air through the air heating duct; a first radiator and a second radiator in the air heating duct, said radiators being adapted for the said stream of air to pass through them, the said first radiator including means for flow of a hot fluid through the first radiator whereby to yield heat to the said air, and the second radiator being an electrical auxiliary radiator; air outlet means exhausting into the cabin, the air heating duct having a downstream end connected to the said air outlet means; command means in the cabin adapted for a user of the vehicle to set required values of atmospheric parameters representing cabin conditions by means of the said command means; and signal processing means connected to the command means for receiving signals from the command means representing said required values, the signal processing means being connected to elements of the apparatus for controlling operation of the said elements according to the said required values of cabin condition parameters set by the user, wherein the method comprises the following phases:

(a) measuring the temperature of the said fluid in the first radiator, and (b) making a selective decision relating to the energisation of the auxiliary radiator, as a function of at least the said required values of parameters set by the user and the measured temperature of the said fluid.

12. A method according to claim 11, wherein phase (b) includes the steps of:

(b1) calculating a theoretical value of heating power required to achieve at least the said required values of parameters set by the user, (b2) calculating the heating power available from the first radiator, as a function of the measured temperature of the said fluid, and (b3) comparing the theoretical heating power calculated in step (b1) with the available heating power calculated in step (b2).

13. A method according to claim 12, including the further step of measuring at least one atmospheric parameter in at least one location selected from inside and outside the cabin, and transmitting at least one signal representing the measured value of the said at least one parameter to the signal processing means, wherein in step (b1) the calculation of the theoretical heating power is responsive to the said at least one signal.

14. A method according to claim 11, wherein, in phase (b), a decision to energise the auxiliary radiator is taken in response to the available heating power measured in step (b2) being less than the theoretical heating power calculated in step (b1).

15. A method according to claim 11, wherein, in phase (b), when the available heating power measured in step (b2) is lower than the theoretical heating power measured in step (b1), the method includes a further step after step (b2), said further step comprising determining the additional heating power necessary at the auxiliary radiator in order to the theoretical heating power to be equal to the sum of the available heating power and the said additional heating power.

16. A method according to claim 11, wherein phases (a) and (b) are repeated periodically so long as the apparatus is in use.

* * * * *